(12) United States Patent
Collet et al.

(10) Patent No.: US 11,270,143 B2
(45) Date of Patent: Mar. 8, 2022

(54) COMPUTER IMPLEMENTED METHOD AND SYSTEM FOR OPTICAL CHARACTER RECOGNITION

(71) Applicant: I.R.I.S., Mont-Saint-Guibert (BE)

(72) Inventors: Frederic Collet, Etterbeek (BE); Jordi Hautot, Alleur (BE); Michel Dauw, Machelen (BE)

(*) Notice: Subject to any disclaimer, the term of this patent is extended or adjusted under 35 U.S.C. 154(b) by 510 days.

(21) Appl. No.: 15/906,240

(22) Filed: Feb. 27, 2018

(65) Prior Publication Data
US 2018/0260652 A1  Sep. 13, 2018

(30) Foreign Application Priority Data
Feb. 27, 2017  (BE) .................................. 2017/5119

(51) Int. Cl.
*G06K 9/34* (2006.01)
*G06K 9/68* (2006.01)
*G06K 9/72* (2006.01)

(52) U.S. Cl.
CPC ............. *G06K 9/344* (2013.01); *G06K 9/348* (2013.01); *G06K 9/6857* (2013.01); *G06K 9/723* (2013.01); *G06K 2209/01* (2013.01); *G06K 2209/011* (2013.01)

(58) Field of Classification Search
CPC ...... G06K 9/344; G06K 9/723; G06K 9/6857; G06K 9/348; G06K 2209/01; G06K 2209/011
See application file for complete search history.

(56) References Cited

U.S. PATENT DOCUMENTS

| | | | | |
|---|---|---|---|---|
| 5,519,786 A * | 5/1996 | Courtney | ............. | G06K 9/6292 382/159 |
| 7,620,268 B2 * | 11/2009 | Myers | ................... | G06K 9/3258 382/174 |
| 2010/0310172 A1 * | 12/2010 | Natarajan | .......... | G06K 9/00865 382/187 |
| 2014/0023273 A1 * | 1/2014 | Baheti | ...................... | G06K 9/72 382/177 |
| 2014/0168478 A1 * | 6/2014 | Baheti | .................. | G06K 9/3258 348/240.99 |
| 2015/0356365 A1 * | 12/2015 | Collet | .................... | G06K 9/344 382/177 |

OTHER PUBLICATIONS

Zhang Heng et al: "Character confidence based on N-best list for keyword spotting in online Chinese handwritten documents", Pattern Recognition, Elsevier, GB, vol. 47, No. 5. Dec. 11, 2013 (Dec. 11, 2013), pp. 1880-1890, XP028815396, ISSN: 0031-3203, DOI: 10.1016/J, PATCOG.2013.12.001.

* cited by examiner

*Primary Examiner* — John W Lee
(74) *Attorney, Agent, or Firm* — SRIPLAW; Joseph A. Dunne

(57) ABSTRACT

A computer implemented method for optical character recognition (OCR) of a character string in a text image. The method efficiently combines two different OCR engines with the computation that needs to be done by the second OCR engine depending on the results found by the first OCR engine. This method provides, in particular, a high speed and accurate results when the first OCR engine is fast and the second OCR engine is accurate. The combination is possible because the second OCR engine identifies each segment to be processed by the second OCR engine without needing to process all segments.

15 Claims, 9 Drawing Sheets

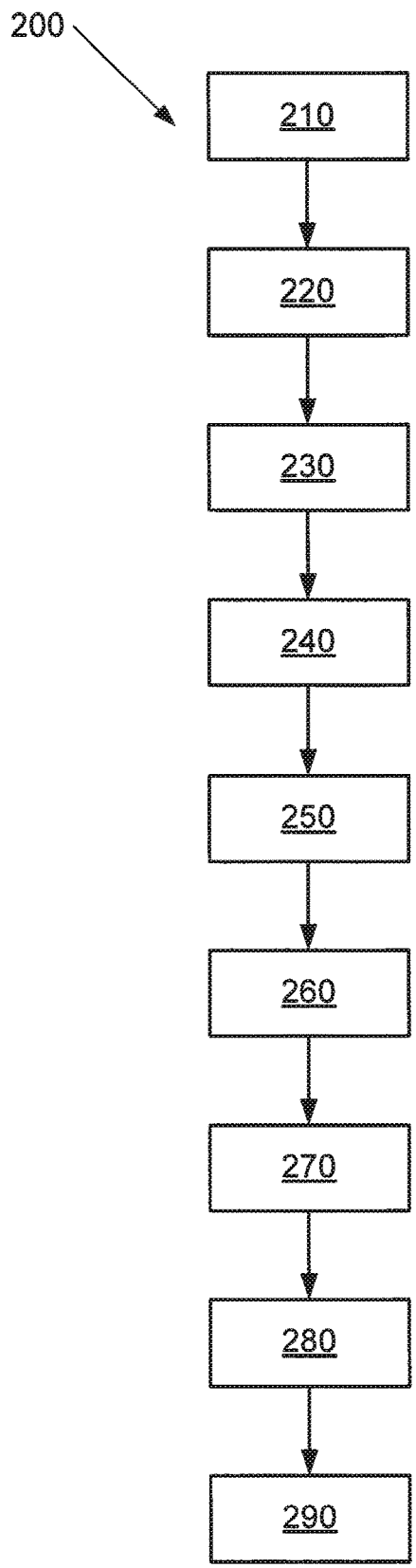
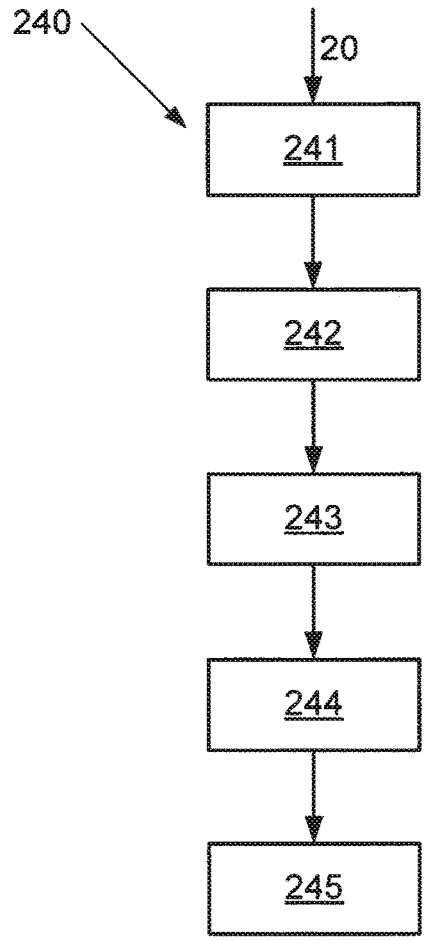
Fig. 2
Fig. 3

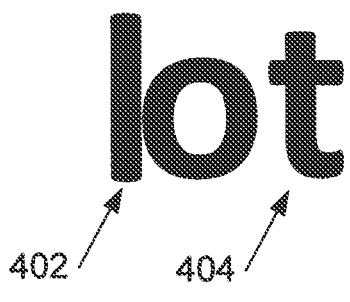
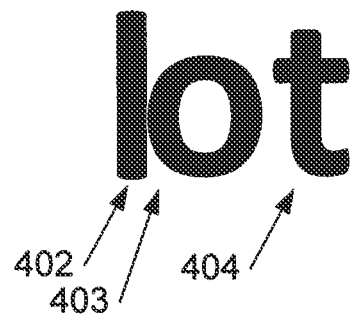
*Fig. 4A*          *Fig. 4B*
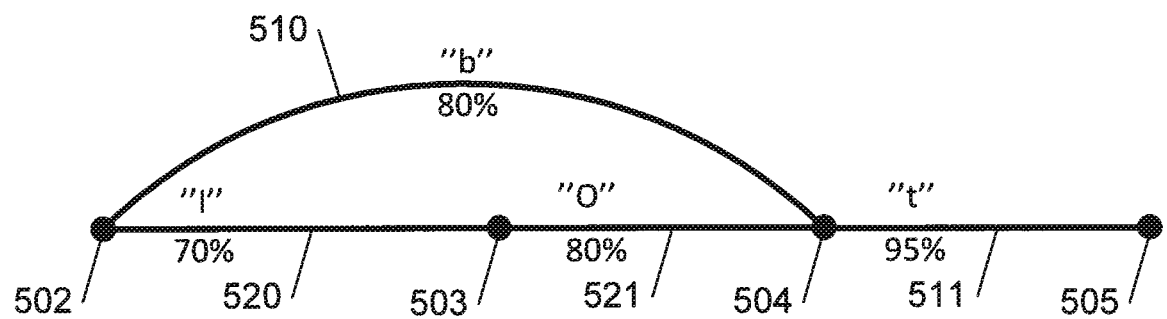
*Fig. 5*

COMPUTER IMPLEMENTED METHOD AND SYSTEM FOR OPTICAL CHARACTER RECOGNITION

TECHNICAL FIELD

The present disclosure relates to a computer implemented method for optical character recognition (OCR). Specifically, the present disclosure relates to an OCR method of a character string in a text image. The present disclosure also relates to a system for OCR of a character string in a text image.

BACKGROUND ART

In general, OCR methods are used to convert one or more strings of characters in a text image into machine-readable code by using a character recognition method to identify the characters represented in the text image. An OCR method is typically implemented in an OCR engine. These OCR engines have to work fast with limited computing resources and have to accurately recognize characters. Speed, limited resources and accuracy are contradictory requirements and, in practice, a good OCR engine is based on trade-offs between these characteristics.

US-A-2015/0356365 discloses an OCR system that combines two different OCR engines to accurately recognize a character string comprising different characters. Specifically, the first OCR engine is designed for Asian characters and the second OCR engine for Latin characters with the first OCR engine deciding which segments need to be processed by the second OCR engine. This is disadvantageous as the first OCR engine may make mistakes in selecting the segments for processing by the second OCR engine. Therefore, in practice, both OCR engines are used to analyze the entire character string. As such, this system with two OCR engines either requires duplicated computing resources or is not fast enough.

SUMMARY OF THE DISCLOSURE

It is an object of the present disclosure to provide a more efficient OCR method that combines two OCR engines.

This object is achieved according to the present disclosure with a computer implemented method for optical character recognition (OCR) of a character string in a text image, the method comprising the steps of: a) segmenting, by a first OCR engine, the character string into one or more segments; b) determining, by the first OCR engine, one or more hypotheses on at least one segment of the character string, each hypothesis being associated with a probability; c) subsequently to determining one or more hypotheses on each segment of the character string, identifying a segment of the character string for further processing; and d) applying, by a second OCR engine, a second OCR to the identified segment.

By identifying segments that need to be processed, not all the segments have to be processed by the second OCR engine. As such, the OCR method is more efficient and requires less computing resources, and thus less time, to perform OCR on a text image.

In an embodiment, the method further comprises the steps of: subsequently to applying the second OCR to the identified segment, identifying a further segment of the character string for further processing, said further segment being in the part of the character string following the identified segment; and applying, by the second OCR engine, a second OCR to the further segment.

As such, the output from the second OCR engine may also be taken into account when assessing whether a segment needs to be processed further.

In an alternative embodiment, step d) is performed subsequently to having identified each segment of the character string for further processing.

In an embodiment, step c) comprises the step of ordering, for each segment, its one or more candidates from highest to lowest likelihood in an ordered list.

This provides a list from which individual candidates can be selected for consideration and further processing.

In an embodiment of the present disclosure, step c) comprises the steps of: determining, for said segment, the highest probability associated with said segment; and identifying said segment as a segment to be processed further if said highest probability is below a predetermined highest likelihood threshold.

In this embodiment, if the most likely candidate's estimated likelihood of a segment is deemed not to exceed the highest likelihood threshold, the segment is processed by the second OCR engine. Using this thresholding establishes whether the segment was identified with a high enough certainty and, if not, it is processed by the second OCR engine.

In an embodiment of the present disclosure, step c) comprises the steps of: determining, for said segment, a second-highest probability associated with said segment; and identifying said segment to be processed further if said-highest probability is above a second-highest threshold.

In this embodiment, if the second most likely hypothesis of a segment is above said second second-highest threshold, the segment is processed by the second OCR engine. As such, when there is ambiguity between the two most likely hypothesis, the segment is processed by the second OCR engine.

In an embodiment of the present disclosure, step c) comprises the steps of: determining, for said segment, the highest and the second-highest probability associated with said segment; determining, for said segment, a difference between said highest and said second highest probability; and identifying said segment to be processed further if said difference is below a predetermined likelihood difference threshold.

In this embodiment, if the difference between the first candidate and the second candidate is below the likelihood difference threshold, the segment is processed by the second OCR engine. As such, when there is ambiguity between the two most likely hypothesis, the segment is processed by the second OCR engine.

In an embodiment of the present disclosure, step c) comprises the steps of: determining, for said segment, the highest probability of a first neighboring segment and the highest probability of a second neighboring segment; and identifying said segment to be processed further if said highest neighboring probability of said first neighboring segment or said second neighboring segment is below a predetermined highest neighbor likelihood threshold.

In this embodiment, if the most likely hypothesis of a neighbor is below said highest neighbor likelihood threshold, the segment is processed by the second OCR engine. As such, when it is deemed that one or both of the neighboring segments were not identified with a high enough probability, the segment is processed by the second OCR engine.

In an embodiment of the present disclosure, step c) comprises the steps of: determining, for said segment, a bounding box of said segment and a neighboring bounding box of a neighboring segment; determining, for said segment, a distance between the bounding box and the neighboring bounding box; and identifying said segment to be processed further if said distance is below a predetermined bounding box threshold.

In this embodiment, when the bounding boxes are too close, i.e. when the segments might form a single segment, the segment is processed by the second OCR engine. In other words, when the segments are too close, they are also processed by the second OCR engine thereby mitigating, among others, the risk that these segments may belong to the same character.

In an embodiment of the present disclosure, step c) comprises the steps of: determining, for said segment, a starting point and a width of said segment; determining, for said segment, by a segmentation module in the second OCR engine, an expected width of a segment at said starting point; determining, for said segment, a ratio of said width and said expected width; and identifying said segment to be processed further if said ratio is outside of a predetermined range.

In this embodiment, when the second OCR engine would not expect a width, at this segmentation point, that is close enough to the width proposed by the first OCR engine, the segment is processed by the second OCR engine.

In an embodiment, step c) is performed by the second OCR engine.

In an embodiment of the present disclosure, step d) comprises the steps of: segmenting, by a segmentation module in the second OCR engine, a segment of the one or more identified segments into one or more second segments; if a second segment has been processed by the first OCR engine, retrieving, from the first OCR engine, a plurality of hypotheses for said second segment; if said second segment has not been processed by the first OCR engine, determining, by a classifier in the first OCR engine, a plurality of hypotheses for said second segment; and determining, by a classifier of the second OCR engine, a probability associated with one or more of said plurality of hypotheses.

In this embodiment, when a segment identified to be processed by the second OCR engine has already been processed by the first OCR engine, the result, i.e. a plurality of hypotheses, is retrieved. Alternatively, when a segment identified to be processed by the second OCR engine has not yet been processed by the first OCR engine, the classifier in the first OCR engine is used to determine a plurality of hypotheses. In both cases, the classifier in the second OCR engine is limited to only the plurality of hypotheses. As such, less computing resources are required by the second OCR engine, thus further increasing the efficiency of the OCR method.

The object of the present disclosure is also achieved with a computer implemented method for optical character recognition (OCR) of a character string in a text image, the method comprising the steps of: segmenting, by a first OCR engine, the character string into one or more segments; determining, by a first classifier of the first OCR engine, a plurality of hypotheses for a segment of the character string; and determining, by a second classifier of a second OCR engine, a probability associated with one or more of said plurality of hypotheses.

By limiting the classifier in the second OCR engine to only the plurality of hypotheses, less computing resources are used by the second OCR engine, thus increasing the efficiency of the OCR method.

In an embodiment of the present disclosure, a non-transitory computer readable medium storing a program, which when loaded on a computerized system, causes the computerized system to execute a method for OCR of a character string in a text image as described above, is provided.

It is also an object of the present disclosure to provide a more efficient OCR system by combining two OCR engines.

This object is achieved according to the present disclosure with a system for optical character recognition (OCR) of a character string in a text image, the system comprising: a first OCR engine comprising: a first segmentation module configured for segmenting the character string into one or more segments; and a first classifier configured for determining one or more hypotheses on at least one segment of the character string, each hypothesis being associated with a probability, a second OCR engine comprising: a segment identification module configured for, subsequently to determining one or more hypotheses on each segment of the character string, identifying a segment of the character string for further processing; and a second segmentation module and a second classifier configured for applying a second OCR to the identified segment.

This object is also achieved according to the present disclosure with a system for optical character recognition (OCR) of a character string in a text image, the system comprising: a first OCR engine comprising: a first segmentation module configured for segmenting the character string into one or more segments; and a first classifier configured for determining a plurality of hypotheses on a segment of the character string, and a second OCR engine comprising a second classifier configured for determining a probability associated with one or more of said plurality of hypotheses.

Both these systems have the same advantages as their method counter parts described above.

In an embodiment of the present disclosure, the first OCR engine is faster than the second OCR engine.

In an embodiment of the present disclosure, the second OCR engine is more accurate than the first OCR engine.

BRIEF DESCRIPTION OF THE DRAWINGS

The disclosure will be further explained by means of the following description and the appended figures.

FIG. 2 shows a flowchart of an OCR method of the present disclosure of a character string in a text image.

FIG. 3 shows a flowchart of the graph generation step in FIG. 2.

FIGS. 4A and 4B illustrates an example of a text image having a string of characters with two different sets of segmentation points.

FIG. 5 illustrates an example of a single graph corresponding to the text image and the two sets of segmentation points of FIGS. 4A and 4B.

DESCRIPTION OF THE DISCLOSURE

Figure 1:
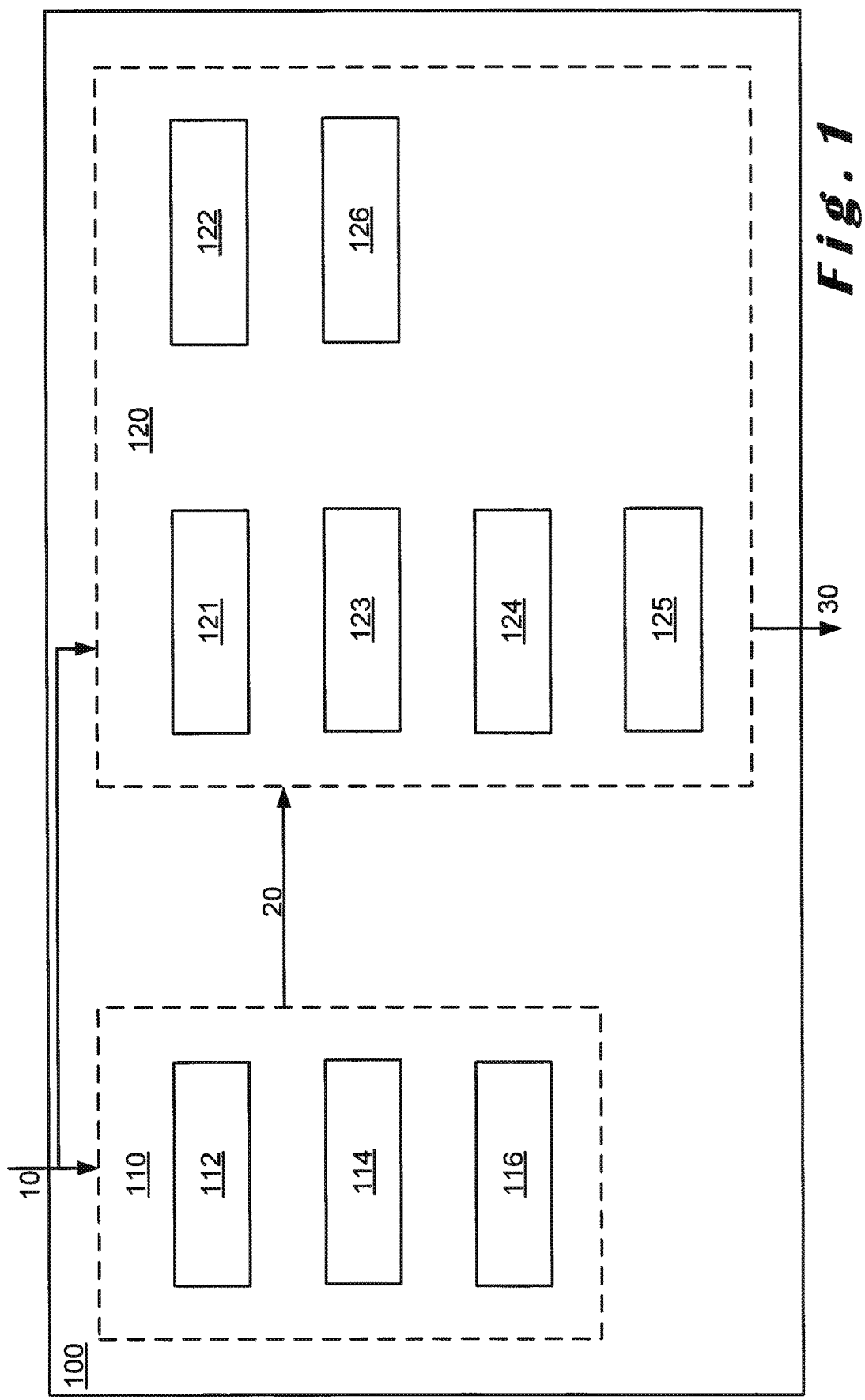
FIG. 1 shows an overview of a system of the present disclosure used for OCR of a character string in a text image.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

As used herein, the term a "text image" is intended to mean a bi-tonal image, i.e. a pixel map with each pixel representing a binary value (ON or OFF, 1 or 0, black or white), comprising one or more character strings.

As used herein, the term "Optical Character Recognition (OCR)" is intended to mean any conversion of a text image into a machine-readable code. An OCR may be a simple single-character classification, but it may also be complex and include decision models.

As used herein, the term "OCR engine" is intended to mean a computerized system capable of performing OCR on a text image.

As used herein, the term "character" is intended to mean a symbol or sign used in writing, e.g. a grapheme, a logogram, an alphabetic letter, a typographical ligature, a numerical digit, a punctuation sign, etc.

As used herein, the term "position" is intended to mean a character position and refers to data which makes it possible to locate the character. For example, the position may be provided by the coordinates of the pixels of a bounding box that surrounds the character. A further example, the position may be provided by the position of connected components that compose the character or possibly by a subdivision of a connected component that forms a character.

As used herein, the term "connected component" is intended to mean a set of pixels that fulfils all of the following conditions:
  each pixel of the connected component has the same value;
  each pixel of the connected component is connected to each of the pixels of the connected component by a path made of pixels which belong to the connected component;
  the connected component is not included in a larger set of components that fulfils the previous conditions, i.e. it is not included in a larger connected component.

As used herein, the term "segment" is intended to mean a grouping of one or more connected components or parts of a connected component that together may form one or more characters.

As used herein, the term "segmentation" is intended to mean a division of a character string into segments. The segmentation is an output of an OCR engine.

As used herein, the term "segmentation point" is intended to mean the point at a boundary between characters. For example, a segmentation point of a character may be provided by the leftmost black pixel of a bounding box of the character or by the leftmost black pixel of the character.

As used herein, the term "identification" is intended to mean a recognition of one or more character in machine-readable code to obtain a searchable string of characters. The identification is an output of an OCR engine.

As used herein, the terms "hypothesis" and "identification hypothesis" are intended to mean a solution for the identification of a character or group of characters in a segment.

As used herein, the terms "hypotheses" and "identification hypotheses" are intended to mean alternative solutions for the identification of a character or group of characters in a segment. Alternative hypotheses may be different possible characters, i.e. different character candidates, for the same segment or may be alternative segmentations. It will be appreciated that one or more hypotheses are the output of the classification and that a decision may still have to be made on the final identification of the characters. Each identification hypothesis is associated with a probability. In other words, each hypothesis is a pair including a solution (e.g. a character) and a probability that the solution is correct.

As used herein, the term "probability" is intended to mean an estimated likelihood which has a value, typically between 0 and 1, that provides an indication of the likelihood that an identification hypothesis is correct, i.e. that the segment that undergoes the classification indeed represents the character or the group of characters of the identification hypothesis. It will be appreciated that probabilities from different OCR engines may be on different scales, in which case, a conversion may be used to make them comparable.

As used herein, the term "classification" is intended to mean the generation of one or more hypotheses on the identification of one or more characters in a segment.

As used herein, the term "classifier" is intended to mean a module, typically contained in an OCR engine, that can perform classification of a segment. This may be a single-character classifier that is designed to classify characters one by one.

As used herein, the term "decision model" is intended to mean a model that may be used to choose one or more hypotheses of one or more hypotheses based on various factors including but not limited to language, context, etc. Choosing one or more hypotheses may be effected by modifying and/or substituting the probability associated therewith. Decision models may include bigrams, typographical metrics, lists of words (e.g. dictionaries), character n-grams, punctuation rules, spacing rules, etc. For example, a decision model may include contextual decisions that decide on the identification of a character by its context (e.g. a whole word may be considered to decide on the identification of every character of the word).

As used herein, the term "data structure" is intended to mean an entity comprising data.

As used herein, the term "graph" is intended to mean a data structure comprising nodes and edges with an associated edge value.

FIG. 1 shows an overview of a system 100 used for OCR on an input text image 10. The system 100 comprises a first OCR engine 110 and a second OCR engine 120. The first OCR engine 110 comprises a first segmentation module 112, a first classifier 114 and a first decision module 116.

The first OCR engine 110 processes the information contained in the input text image 10 and provides a first OCR output 20. This output 20 comprises a segmentation of a character string in the text image 10 and a classification of each segment, each classification being associated with one or more probabilities. The classification together with the segmentation may be a sequence of character candidates with the segmentation points provided by the positions of the characters or it may be a plurality of alternative sequences of character candidates with the positions of the characters.

In determining the first OCR output 20, the first decision module 116 may be used, but it will be readily appreciated that the first OCR engine 110 may also be an OCR engine without a decision module. As described below with respect to FIG. 7, a decision module is used to add decision models to the OCR processing. These decision models may have an effect on the first OCR output 20, for example, by deciding on what character is most likely based on the context. Decision models may include linguistic models, n-gram models, typographical models, etc.

The first OCR output 20 is used, together with the input text image 10, as input for the second OCR engine 120.

The second OCR engine 120 has a graph module 121 configured for processing the first OCR output 20 into a graph and a segment identification module 122 configured for identifying segments in the first OCR output 20 which need to be processed by the second OCR engine 120. These identified segments are then processed by a second segmentation module 123, a second classifier 124 and a second decision module 125. The output from this processing, i.e. the processing by the second segmentation module 123 and the second classifier 124 and/or the processing by the second decision module 125, is used to update the graph, in particular by the graph module 121.

Once all identified segments have been processed and the graph has been finalized, a path determination module 126 determines a path along the graph that has the highest score, i.e. the path along the graph that, when taking into account the probabilities of all the edges, has the highest combined, e.g. multiplicative, likelihood. This path then forms the OCR output 30, i.e. a machine-readable code.

It will be appreciated that the path determination module 126 does not necessarily choose the hypothesis with the highest probability, i.e. a local maximum, but rather maximizes the global probability of the entire decision graph.

In general, the system comprises a computerized system configured to perform the OCR. In some embodiments, this system may be comprised in a single hand held device, such as a smartphone, a camera, a tablet, etc. In other embodiments, the system may comprise a computer and/or a network system with one or more of the various modules possibly being located on different computers within the network.

FIG. 2 shows a flowchart of an OCR method 200 according to the present disclosure using the OCR system 100. In step 210, the text image 10 is input into the first OCR engine 110. In step 220, the first OCR 110 processes the information contained in the input text image 10 to generate the first OCR output 20. In step 230, the first OCR output 20 is input to the second OCR engine 120 together with the input text image 10. In step 240, the graph module 121 processes the first OCR output 20 into a graph as will be described below with respect to FIGS. 3 to 5.

In step 250, segments in the first OCR output 20 are identified as segments which need to be processed further. This identification is performed by the segment identification module 122 and will be described below with respect to FIG. 6.

In step 260, the one or more identified segments are processed by the second segmentation module 123, the second classifier 124 and the second decision module 125 to generate one or more intermediate OCR outputs (as described below with respect to FIGS. 7 to 9) which are input to the graph module 121. As described below, this step may be executed substantially simultaneously with step 250.

In step 270, the graph module 121 uses the one or more intermediate OCR outputs to update the graph. As described below, this step may be executed substantially simultaneously with steps 250 and 260.

In step 280, once all identified segments have been processed and the final graph has been generated, this final graph is input to the path determination module 126 that determines the path along the final graph that has the highest score, i.e. the most likely path. In step 290, this path is then output from the system 100 as the OCR output 30.

It will be appreciated that other types of images, e.g. grayscale or color images, may also be used in the context of the present disclosure. However, these will then be pre-processed to form the text image 10. This pre-processing may include noise reduction, image enhancement, image deconvolution, color image transformation, binarization, cropping, text-picture separation, etc.

FIG. 3 shows a flowchart for step 240 in FIG. 2, i.e. the graph generation from the first OCR output 20. In general, a graph typically starts with a first node, which corresponds to a first segmentation point, that is, typically the segmentation point the furthest left of a character string in the text image 10. The first node is linked to a second node, which corresponds to a second segmentation point, by one or more edges corresponding to one or more characters identified between the first and the second segmentation points. The graph continues with a node for each segmentation point and an edge for each character between the segmentation points. The probabilities of the characters are represented by edge values at the corresponding edges. The graph ends with a node typically corresponding to a point furthest right of the last character in the character string on the text image 10.

FIG. 3 illustrates the steps associated with the generation of the graph from the first OCR output 20 (step 240 in FIG. 2). In step 241, a first segmentation points are determined. This may be done in various ways. For example, the segmentation provided in the first OCR output 20 may be used directly to provide the first segmentation points. It will be appreciated that, if the first OCR output 20 comprises multiple different segmentations, each of these different segmentations may be combined to provide a complete list of all possible first segmentation points.

Alternatively, only the segmentation that was deemed most likely by the first OCR engine 110 may be used to provide the first segmentation points. In this context the most likely solution may be determined by the first OCR engine 110 according to one or more predetermined criteria, which are, for the present disclosure, not relevant. In other words, the present disclosure does not require insight about the way the first OCR engine 110 operates. It only requires a first OCR output 20 comprising at least one segmentation of a character string in the text image 10 and a classification of each segment, each classification being associated with at least one probability. Therefore, the present disclosure is able to combine almost any commercial OCR engine with the second OCR engine 120.

Furthermore, if the first OCR engine 110 outputs the bounding boxes of first character candidates, the first segmentation points can be determined as the points of the leftmost black pixel in each bounding box.

In step 242, a list of nodes is generated such that each node corresponds to a first segmentation point.

In step 243, the edges between the adjacent nodes are generated. Each of these edges represents a single identification hypothesis for the segment between the nodes as described below with reference to FIGS. 4A, 4B and 5.

In step 244, the probabilities of the one or more identification hypotheses of the first OCR output 20 are scaled to be comparable to probabilities of the second OCR engine 120.

In step 245, the probabilities are viewed as edge values and associated with the corresponding edges.

It will be appreciated that, in other embodiments, step 244 may be omitted. For example, the first OCR engine 110 may use probabilities that are directly comparable to the probabilities of the second OCR engine 120.

FIG. 4A illustrates of a text image 10 of a character string. In this example, the first OCR engine 110 has identified two segmentation points 402, 404, the first segmentation point 402 indicating the character "b" with a probability of 80% and the second segmentation point 404 indicating the character "t" with a probability of 95%.

FIG. 4B illustrates the same text image 10 as in FIG. 4A but with a different segmentation. In this example, the first OCR engine 110 has identified three segmentation points 402, 403, 404. The first and third segmentation points 402, 404 have the same position as in the example illustrated in FIG. 4A. The first segmentation point 402 indicates the character "l" with a probability of 70%, the second segmentation point 403 indicating the character "o" with a probability of 80% and the third segmentation point 404 indicating the character "t" with a probability of 95%.

FIG. 5 illustrates the graph generated at step 240 from the first OCR output 20. Node 502 corresponds to segmentation point 402, node 503 to segmentation point 403, node 504 to segmentation point 404 and node 505 to a point at the right of the last character in the text image 10 of the character string. Edge 510 corresponds to character "b" and the associated probability of 80% is also included in the first graph as an edge value. Edge 511 corresponds to the character "t" and the associated probability of 95% is also included in the first graph. Edge 520 corresponds to the character "l" and the associated probability of 70% is also included in the first graph. Edge 521 corresponds to the character "o" and the associated probability of 80% is also included in the first graph.

Figure 6:
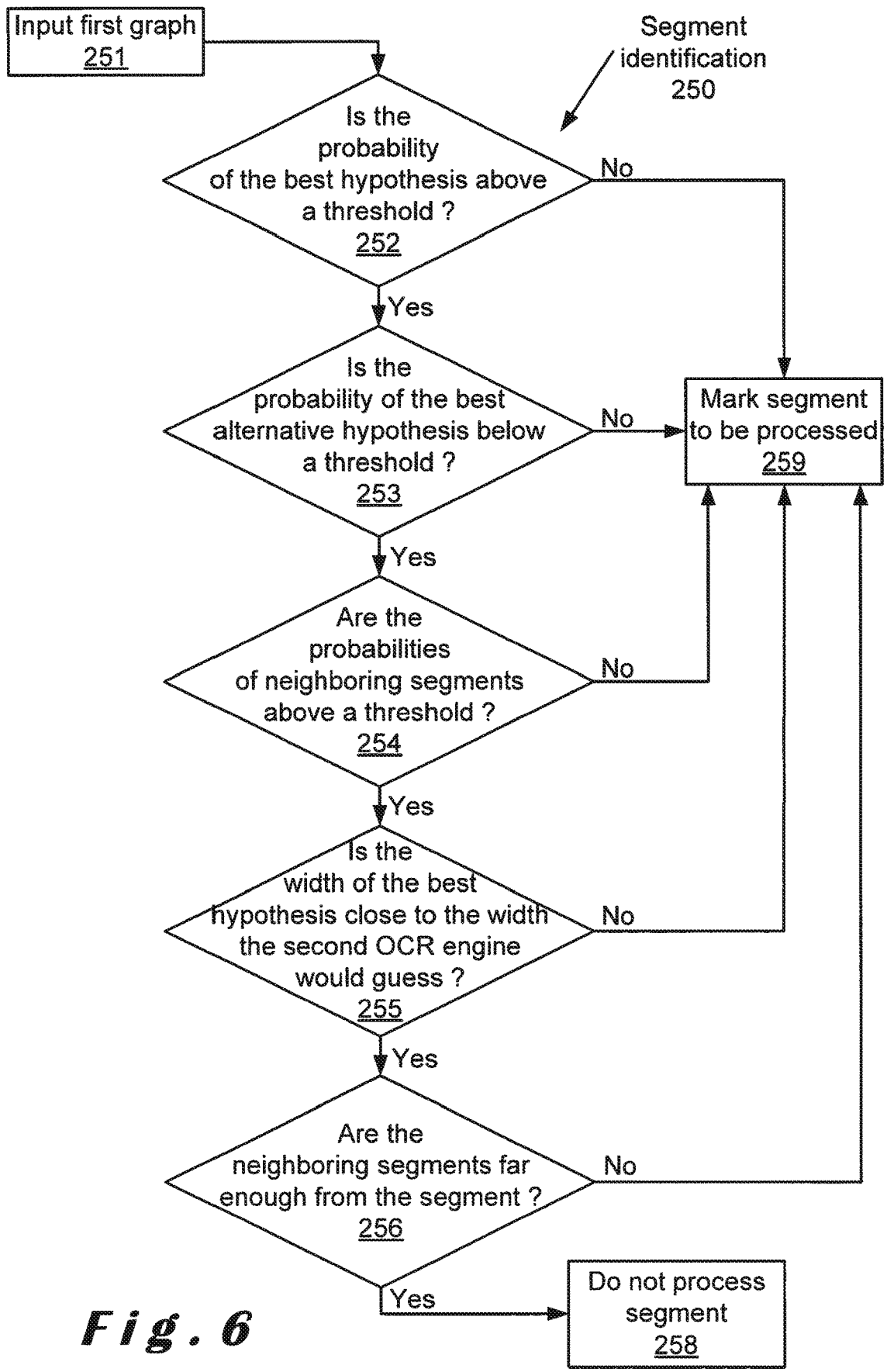
FIG. 6 shows a flowchart of the segment identification step in FIG. 2.

FIG. 6 shows a flowchart of step 250 in FIG. 2, i.e. identifying segments in the first OCR output 20 that need to be processed by the second OCR engine 120. The segmentation identification module 122 then process the segments and determines, for each segment, if that segment was recognized by the first OCR engine 110 with a likelihood that satisfies one or more predetermined criteria. If the segment meets the one or more criteria, it is not processed by the second OCR engine 120, but if it does not meet each of the one or more criteria, the segment will be processed by the second OCR engine 120.

In step 251, the first graph (i.e. the graph generated from the first OCR output 20) is input into the segment identification module 122.

In step 252, for each segment, the probability of the best hypothesis, i.e. the highest probability, is compared to a first predetermined threshold. If the probability is lower than or equal to this first threshold, the segment is marked to be processed in step 259. Using this thresholding establishes whether the segment was identified with a high enough certainty and, if not, it is processed by the second OCR engine 120. In some embodiments, this first predetermined threshold may be set at 0.9 in case the probability associated with an identification hypotheses is expressed as a value between 0 and 1.

In step 253, the probability of the best alternative hypothesis is compared to a second predetermined threshold. When the probability of the best alternative hypothesis is above this second threshold, the segment is marked to be processed in step 259. As such, when there is ambiguity between the two most likely hypothesis, the segment is processed by the second OCR engine 120. In some embodiments, this second threshold may be set at 0.1 in case the probability associated with an identification hypotheses is expressed as a value between 0 and 1.

In step 254, the probabilities of neighboring segments are compared to a third predefined threshold. When the probability of either of these neighboring segments is below this third threshold, the segment is marked to be processed in step 259. As such, when it is deemed that one or both of the neighboring segments were not identified with a high enough probability, the segment is processed by the second OCR engine 120. In some embodiments, this second threshold may be set at 0.2 in case the probability associated with an identification hypotheses is expressed as a value between 0 and 1.

In step 255, the width of a character candidate of the best hypothesis is compared to the width that the second OCR engine 120 expects when segmenting the character string in the text image 10 starting at this segmentation point. In other words, the first OCR engine 110 has identified a segment that starts at a segmentation point and has a first width and the segment identification module 122 activates the second segmentation module 123 to segment the character string in the text image 10 starting at this segmentation point to generate a second width. If the second width proposed by the second segmentation module 123 is not within a predetermined difference of the first width provided by the first OCR engine 110, the segment is marked to be processed in step 259. In some embodiments, the second width needs to be between 0.9 and 1.1 times the first width, i.e. a difference of up to 10% is allowed.

In step 256, the distance between the segment and its neighboring segments is compared to a fourth predefined threshold. Specifically, if either one of the neighboring segments is within a predetermined number of pixels to the segment being considered, that segment is marked to be processed in step 259. In other words, when the segments are too close, they are also processed by the second OCR engine 120 thereby mitigating, among others, the risk that these segments may belong to the same character.

In some embodiments, this fourth threshold may be a single pixel.

If each of steps 252 to 256 has been answered in the positive for a segment, that is, each of the predetermined thresholds has been met, that segment is marked not to be processed in step 258.

It will be readily appreciated that, in other embodiments, one or more of steps 252 to 256 may not be used and/or the ordering of the steps may also be changed. It will further be appreciated that additional steps may also be included, for example, when the first OCR engine 110 is known to have difficulties with one or more characters and the best hypothesis on the segment indicates such a character, the segment may be marked to be processed.

Another example of an additional step may be checking if the difference between the highest probability and the second highest probability is below a threshold, and, if so, processing the segment.

A further example of an additional step may be ordering the probabilities associated with a segment from high to low or low to high. This ordering enables an easy determination of the highest and/or second-highest probability of one or more segments. Preferably, the ordering is executed before any of steps 252 to 256.

It will be appreciated that, once the segments to be processed have been identified, the graph may be updated. For example, this may be done by putting a flag in the graph to indicate that the segmentation point that starts this segment needs to be processed, or, alternatively, a flag that indicates that this segment has not yet been processed.

By identifying segments that need to be processed, not all the segments have to be processed by the second OCR engine 120. As such, the OCR method 200 is more efficient and requires less computing resources, and thus less time, to perform OCR on a text image 10.

In an embodiment, a single segment may be identified for processing by the second OCR engine 120 and, after this first segment has been processed, a second segment may be identified for processing by the second OCR engine 120. In other words, steps 250 and 260 (and also step 270 as described below) may be performed interleaved. This is advantageous as it allows identifying segments to be processed by also taking into account additional information on segments already processed by the second OCR engine 120.

Figure 7:
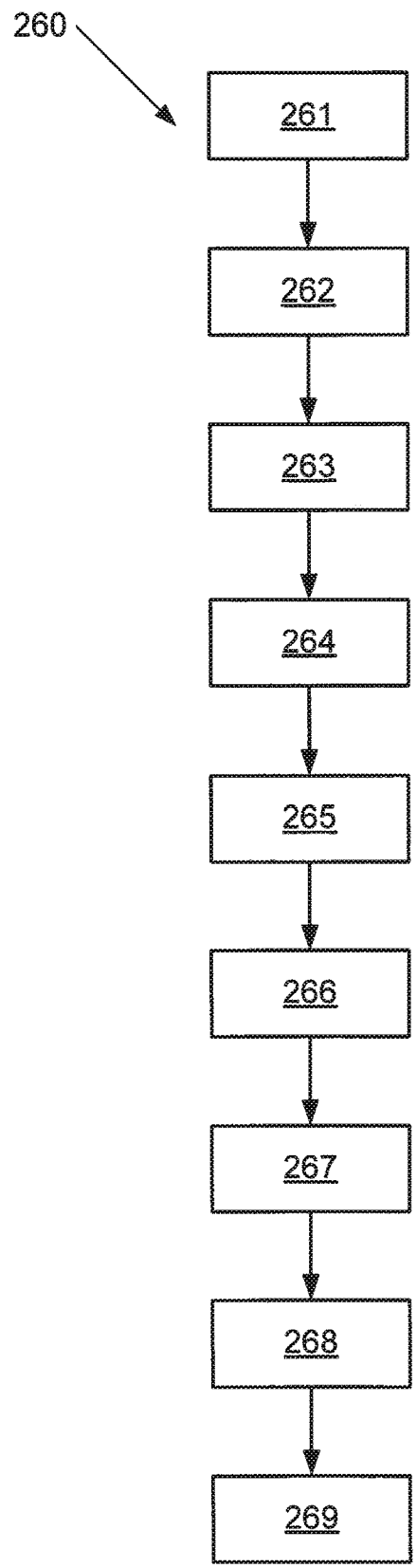
FIG. 7 shows a flowchart of the processing of identified segments step in FIG. 2.

FIG. 7 illustrates a flowchart of step 260 of FIG. 2, i.e. how an identified segment is processed. It will be appreciated that multiple identified segments may be adjacent to one another, and, in that case, these segments are processed as a single identified segment.

For example, referring to FIG. 5, both segments 520, 521 may be identified for processing by the second OCR engine 120, and, in which case, these segments may be processed together. Alternatively, each of the identified segments may be processed individually by the second OCR engine 120. Therefore, in the context of FIGS. 7 to 9, a segment to be processed may comprise a single identified segment or multiple adjacent identified segments.

In step 261, a stack is generated. This stack comprises a list of segmentation points or a data structure comprising segmentation points. Specifically, this stack comprises at least one segmentation point, i.e. the start node of a segment to be processed, but it may also comprise multiple nodes including the start, for example if multiple segments are identified as being next to one another.

The second segmentation module 123 starts iterating on the segmentation points of the stack with a segmentation point index "k" set equal to a first value, for example, 1. The first segmentation point that is considered in the second segmentation module 123 is typically one of the first segmentation points determined by the first OCR engine 110 and identified to be processed by the segment identification module 122. Preferably, the segmentation point is removed from the stack, preferably, in such a way that the stack contains only segmentation points that still have to be considered. Furthermore, the segmentation point may be placed in a list of segmentation points already processed, which may lead to an update of the graph by the graph module 121.

In step 262, for a single segmentation point, a list of widths is generated. In an embodiment, the list of widths is generated, at step 262, as described in U.S. Pat. No. 9,183,636 which is incorporated herein by reference, and where the segmentation points generated by the first OCR engine 110 are used as input. In an embodiment, width generation uses a database which stores reference character widths, an average width, and, possibly other character statistics. The width generation is based on the width of characters already recognized. These width are compared to a database of widths for each character in order to estimate as accurately as possible the point size of the font. The width generation is preferably also based on the size(s) of connected component(s) after the segmentation point k, the size(s) being provided by the text image 10.

In step 263, the second segmentation module 123 starts iterating on the widths of the list of widths, with a width index "i" set equal to a first value, for example 1. A width, coming from the list of widths, is considered. The combination of the segmentation point k and the width i provides a segment corresponding to a portion of the text image 10.

In step 264, a classification is performed on the segment by the second classifier 124. The second classifier 124 preferably performs a single-character classification. The second classifier 124 may include a character classification designed for a first type of character, for example, Asian characters, and a character classification designed for a second type of character, for example, Latin characters.

The second classifier 124 provides at least one second identification hypothesis with an associated probability. The identification hypothesis is a hypothesis about a character which is possibly present on the segment. The probability is a value between 0 and 1, and, decreases with the probability that the classification has correctly identified the content of the segment. In other embodiments, the complement of the probability may also be used as a probability.

In step 265, the second classifier 124 checks if the probability fulfils a first predetermined criterion, for example, that the probability is smaller than a threshold value. This threshold value may be 0.05. If the first predetermined criterion is not fulfilled, the index "i" is incremented and a next width, coming from the list of widths, is considered. In other words, steps 263 to 265 are repeated and another second identification hypothesis is generated. If the first predetermined criterion is fulfilled, it indicates that the second identification hypothesis may be correct.

If the first predetermined criterion is fulfilled, the second identification hypothesis together with its position are output, in step 266, as an intermediate OCR output, and, the stack is updated in step 267 (described below with respect to FIG. 8). This intermediate OCR output is added in the graph during an update of the graph by the graph module 121. The second identification hypothesis, together with its position, may not be outputted as such by the second classifier 124, but just added in the graph. The position of the second identification hypothesis is provided by the segment where the second identification hypothesis was identified, i.e. by the segmentation point k and the width i considered. The update of the graph is preferably performed immediately after an identification hypothesis fulfils the first predetermined criterion.

In other embodiments, the second classifier 124 may provide a plurality of identification hypotheses all corresponding to the same segment, each of these hypotheses fulfilling the first predetermined criterion. In such a case, each of these hypotheses are included in the graph at the same time before moving to a next segment.

In yet other embodiments, the second segmentation module 123 and the second classifier 124 may provide a plurality of identification hypotheses for a plurality of segments. In other words, different segments may be proposed, each with one or more identification hypotheses.

It will be appreciated that, in the case where the segment to be processed comprises multiple adjacent identified segments, the second segmentation module 123 and the second classifier 124 may provide more or fewer segmentation points compared to the first OCR engine 110. For example, referring to FIG. 5, the first OCR engine 110 may output two segments 520, 521 identifying the characters "l" and "o", while the second OCR engine 120 may identify this as a single segment identifying character "b". In this case, there are two segmentation points from the first OCR engine 110 with only a single segmentation point in the second OCR engine 120.

In an embodiment, if the first predetermined criterion is fulfilled, an update of the average list is performed and the updated average width replaces the average width in the database. Preferably, the update of the average width is followed by the generation 262 of the list of widths, which generates the list of widths to be used for the same segmentation point k in the next iteration on the widths.

The first predetermined criterion provides a tuneable parameter to determine the threshold of probability from which the identification hypotheses are added into the graph. A low threshold provides a very large graph, which gives a high accuracy but may slow down the OCR method 200. A higher threshold provides a smaller graph, which may give a lower accuracy but speeds up the OCR method 200.

In alternative embodiments, other criteria may be used to determine whether a second identification hypothesis, together with its position, is used in an update of the graph and/or whether the update of the list of widths is performed.

For example, if the first predetermined criterion is fulfilled, step 265 may comprises checking if the probability fulfils a second predetermined criterion. In particular, the second criterion may be that the probability is smaller than a threshold that indicates a low likelihood, i.e. preferably chosen between 0.05 and 0.5, for example, equal to 0.2 in case the probability associated with an identification hypotheses is expressed as a value between 0 and 1. If the second predetermined criterion is not fulfilled, the index "i" is incremented and a next width, coming from the list of widths, is considered. If the second predetermined criterion is fulfilled, the second identification hypothesis, together with its position, are output, in step 266, as an intermediate OCR output and the stack is updated in step 267 (described below with respect to FIG. 8). This second predetermined criterion provides another tuneable parameter to determine the threshold of probability from which the identification hypotheses are added into the graph.

Alternatively, the first predetermined criterion may be set at 0, and, step 265 may be skipped. In this embodiment, all possible identification hypotheses are included in the graph.

After one or more identification hypotheses for segmentation point k have been determined, the second segmentation module 123 will need to determine the next segmentation point by updating the stack (step 267). This process is described in detail with respect to FIG. 8.

Figure 8:
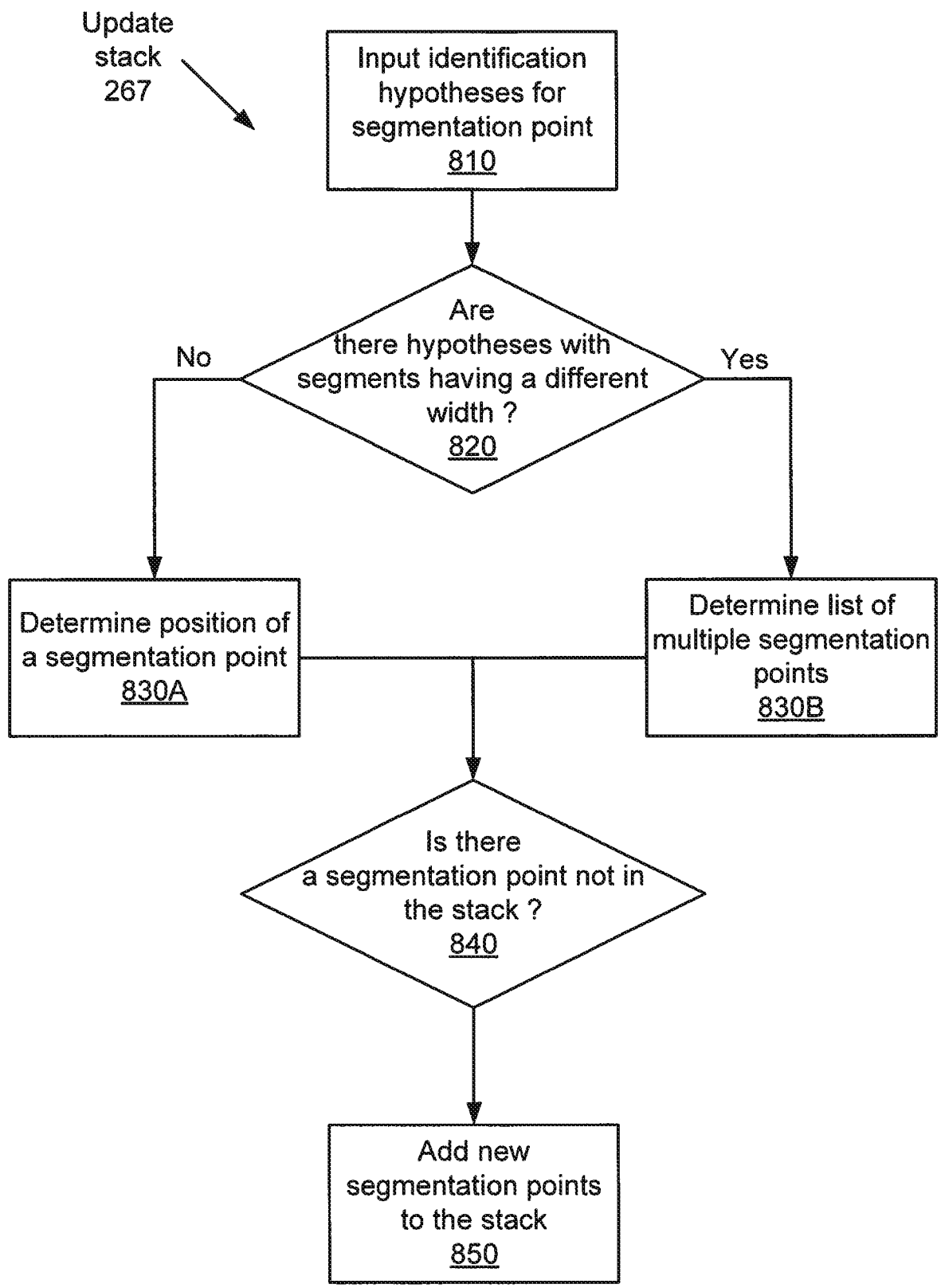
FIG. 8 shows a flowchart of the stack update step in FIG. 7.
Figure 9:
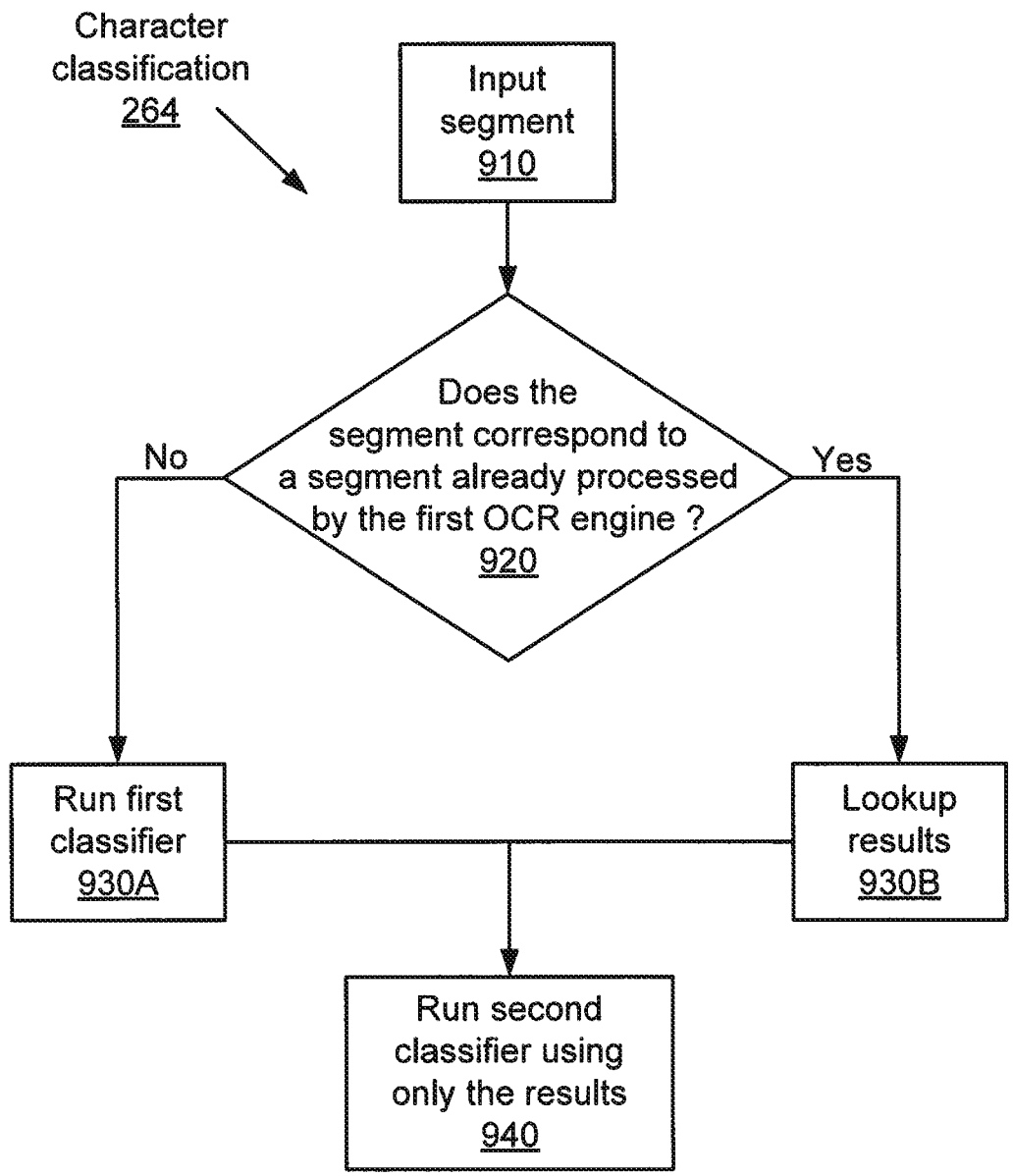
FIG. 9 shows a flowchart of the optional first OCR engine lookup step in the classification step in FIG. 7.

Turning now to FIG. 8, the process for updating a stack is shown. In step 810, the one or more identification hypotheses determined for segmentation point k are input into the second segmentation module 123.

In step 820, if the one or more identification hypotheses all have the same width, i.e. if they relate to the same segment, or if one or more of the identification hypotheses have a different width. If all identification hypotheses do not have the same width, a single next segmentation point is determined in step 830A. This may be done by adding the width of the identification hypothesis to the position of the segmentation point k. If all identification hypotheses have the same width, a list of possible next segmentation points is determined in step 830B. Iterations may be performed by adding different widths of the identification hypotheses to the position of the segmentation point k.

Preferably, subsequent segmentation points are determined as the leftmost black pixel at the right of the $k^{th}$ segment. In other words, the next segmentation points also take into account the possible inter-character space.

In step 840, once the one or more next segmentation points have been determined, these are compared to the segmentation points that are already in the stack. If one or more of the next segmentation points are not already in the stack, they are added in step 850.

It will be appreciated that, in some embodiments, a separate module may be provided to update the stack.

Returning to FIG. 7, once the stack has been updated, the second segmentation module 123 increases the index "k" to "k+1" and continue processing this segmentation point according to steps 262 to 267. If the stack contains no more segmentation points, the second segmentation module 123 preferably performs an end-of-stack step 268. The end-of-stack step 268 comprises a verification that the end of the line to be processed has been reached.

In some embodiments, processing the identified segments may also comprise the additional step of including one or more decision models into the graph (step 269). This step may be performed per identified segment individually, but, preferably, this step is performed only after all identified segments have been processed. The graph, preferably comprising all the identification hypotheses for the one or more identified segments, is then used as input for adding decision models (step 269).

In step 269, decision models may be added to the graph by use of a weighted finite state transducer (WFST) based algorithm. In step 269, both the second decision module 125 and the graph module 121 may be used, but, in other embodiments, the second decision module 125 may also update the graph directly. The addition of decision models modifies the probability of edges (i.e. characters) or group of edges (i.e. groups of characters) in order to favor those that are, according to one or more rules, the most probable, for example, in view of the context of the character string in the input text image 10. As such, decision models modify the weights of paths, and, are preferably related to contextual decisions with typically strongly improved identification accuracy. The decision models may involve bigrams, typographical metrics, lists of words (e.g. dictionaries), character n-grams, punctuation rules, spacing rules, etc.

It will be readily appreciated that step 269 may be omitted in some embodiments. In particular, the second OCR engine 120 may not have a second decision module 125.

A first kind of decision model is a linguistic model. If the word "ornate" is present in the text image 10 to be identified, the first or the second OCR engine 110, 120 may, for example, find the word "omate" and the word "ornate" as identification hypotheses with similar probabilities because the characters "rn", when taken together, look like the character "m". A linguistic model, e.g. using a dictionary, is able to detect that the word "ornate" does not exist, while the word "ornate" does exist, and, weight of the paths that form the word "ornate" are changed accordingly.

In an embodiment, the linguistic model uses an n-gram model. If the word "LIST" is present in the text image 10, the first or the second OCR engine 110, 120 may, for example, find the word "LIST" and the word "LIST" as identification hypotheses with similar probabilities because the character "S" may look like the character "5" in a text image 10. A linguistic model using a bigram (i.e. an n-gram with n=2) model would prefer "LIST" if "IS" and "ST" have better probabilities of occurrence than "I5" and "5T".

Another kind of model that may be used in an embodiment is a typographical model. If the word "Loguivy" is present in the text image 10, the first or the second OCR engine 110, 120 may, for example, find the word "Loguivy" and the word "Loguivv" as identification hypotheses with similar probabilities because the character "y" may look like the character "v" in a text image 10. A typographic model, e.g. using font metrics, would prefer "Loguivy" because the position of the bottom of the final character corresponds to a bottom position of a "y" (in its model) than to a "v".

In an embodiment, the typographical model considers the position of the character in the image to check if sizes and positions of the characters are to be expected or not. Furthermore, in a decision model involving punctuation and spacing rules, some combinations of punctuation and/or spaces may be disfavored.

In an embodiment, a decision model may be used that favors identification hypotheses that have both the first probability (i.e. the probability found by the first OCR engine 110) and the second probability (i.e. the probability found by the second OCR engine 120) fulfilling a predetermined criterion. In this way, if the same identification hypothesis is found by both OCR engines 110, 120, the identification hypothesis is considered to be more likely. Therefore, if for an identification hypothesis, both the first probability and the second probability are above a threshold, this identification hypothesis may be favored. Such a threshold may be set at, for example, 0.9 in case the probability associated with an identification hypotheses is expressed as a value between 0 and 1.

In an embodiment, a decision model may be used that is equivalent to an OCR voting because it favors the first OCR engine 110 in some cases, and, the second OCR engine 120 in other cases. For example, if the first OCR engine 110 is known to be extremely accurate for a first type of characters, e.g. katakana characters, while the second OCR engine 120 is known to be extremely accurate for a second type of characters, e.g. kanji characters, a decision model may be added that favors identification hypotheses corresponding to the first type of characters if these identification hypotheses have been determined by the first OCR engine 110 and favors identification hypotheses corresponding to the second type of characters if these identification hypotheses have been determined by the second OCR engine 120.

After the full decision graph, including both identification hypotheses of the first and second OCR engine 110, 120, with possibly the decision model information, has been determined by the graph module 121, the graph is input into the path determination module 125. This module, in step 290 (FIG. 2), determines the best path along the graph thereby determining the most likely identification hypotheses that form the characters present in the text image 10. In particular, the path determination module 125 determines, from amongst the possible paths defined by the edges joined by nodes in the decision graph, by taking into account the probabilities associated with the edges, the path, i.e. the sequence of identification hypotheses, with the highest probability corresponding to the character string in the input text image 10. The determination of best path may use a WFST based decision algorithm that optimizes a path weight to find the best solution.

In a preferred embodiment, the OCR method 200 may be further optimized by limiting the second classifier 124 to, in certain conditions, only consider character candidates that were already determined by the first classifier 114. As such, the OCR method 200 is more efficient and requires less computing resources, and thus less time, to perform OCR on an input text image 10. This preferred embodiment is described below with respect to FIG. 9.

In step 910, the segment to be classified is input into the second classifier 124. This segment has a segmentation point and a width and thus corresponds to a part of the text image 10.

In step 920, if the first OCR engine 110 has already processed the same segment, i.e. if it has processed the same part of the text image 10, in step 930B, the results thereof are retrieved and loaded into the second classifier 124. If the first OCR engine 110 has not already processed the same segment, in step 930A, the first classifier 114 is used to run a classification on this part of the text image 10 and the results thereof are loaded into the second classifier 124.

In step 940, the second classifier 124 is run, but only on the results provided by the first classifier 114 of the first OCR engine 110. In this case, the second classifier 124 is preferably a staged classifier and only the last stage of the classifier is run on the results provided by the first classifier 114 of the first OCR engine 110. This is especially advantageous when the first classifier 114 is faster than the second classifier 124, that is, when the first classifier 114 provides an OCR output faster than the second classifier 124.

It will be readily appreciated that the step of only considering character candidates that have already been determined by the first classifier 114 may also be used in an OCR method were step 250 is omitted, i.e. in an OCR method where the second OCR engine 120 processes the entire input text image 10 again.

FIGS. 10A, 10B, 11A and 11B illustrate a simple example of the OCR method 200 according to the disclosure without the use of decision models.

Figure 10A:
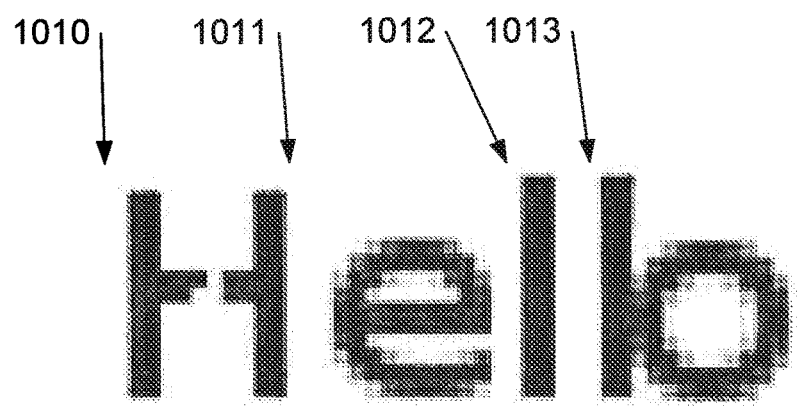
FIGS. 10A, 10B, 11A and 11B illustrate a simple example of the OCR method according to the present disclosure.

In FIG. 10A, the word "Hello" is shown as an example of a text image 10. The first OCR engine 110 has identified four segmentation points 1010, 1011, 1012, 1013 with characters "H" (85% probability), "e" (95% probability), "l" (95% probability) and "b" (80% probability) forming the most likely solution and also providing the solution "H" (85% probability), "e" (95% probability), "l" (90% probability) and "b" (80% probability).

Figure 10B:
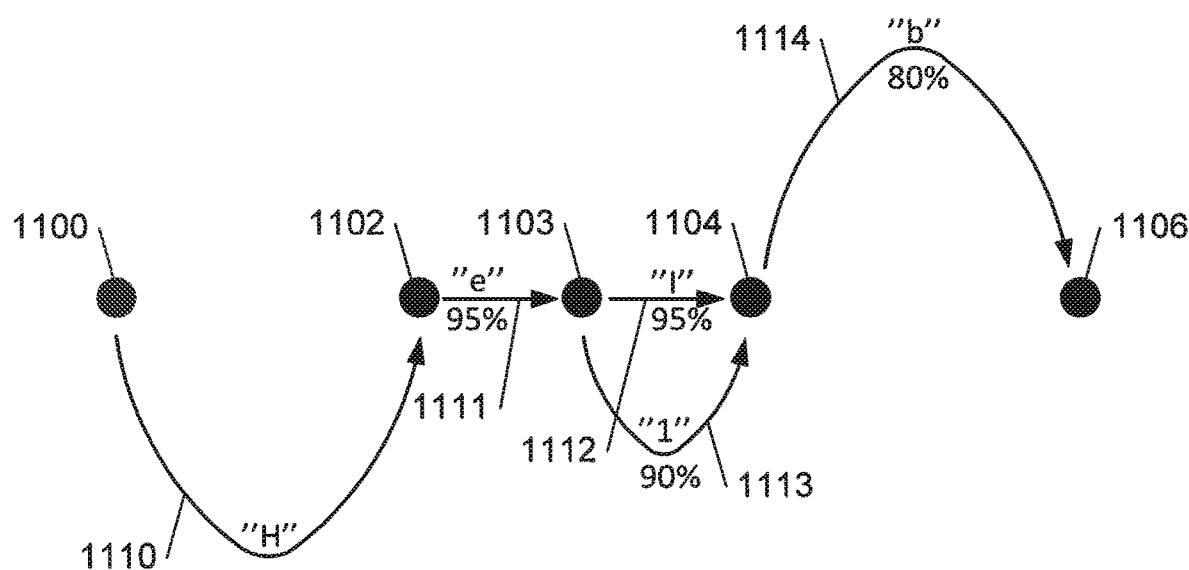

FIG. 10B illustrates the graph generated from the first OCR output 20. There are in total five nodes 1100, 1102, 1103, 1104, 1106, where nodes 1100, 1102, 1103, 1104 correspond to the four segmentation points 1010, 1011, 1012, 1013 and node 1106 the end point of the text image 10. The edges between the nodes are:

1110 representing character "H" with a probability of 85%;
1111 representing character "e" with a probability of 95%;
1112 representing character "l" with a probability of 95%;
1113 representing character "l" with a probability of 90%; and 1114 representing character "b" with a probability of 80%.

In a first embodiment of the disclosure, each of the nodes 1100, 1102, 1103, 1104 representing a segment are analyzed. Specifically, upon analysis of the probabilities, it is determined that node 1100 needs to be processed in the second OCR engine 120 because the probability of character "H" does not pass the thresholding of step 252; node 1102 does not need to be processed as it meets all of the predetermined thresholds; node 1103 needs to be processed in the second OCR engine 120 since the probability 90% ("l") does not pass the thresholding of step 253; and node 1104 needs to be processed because the probability of character "b" does not pass the thresholding of step 252.

Figure 11A:
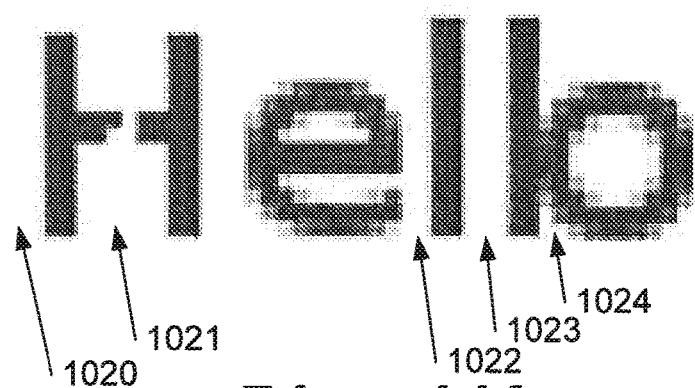

In FIG. 11A, the segmentation points 1020, 1021, 1022, 1023, 1024 of the second OCR engine 120 are indicated. It is clear that there are more segmentation points determined by the second OCR engine 120 when compared to those determined by the first OCR engine 110 (as described above with reference to FIG. 10A). This is mainly because the second OCR engine 120 is more accurate than the first OCR engine 110 albeit slower.

Figure 11B:
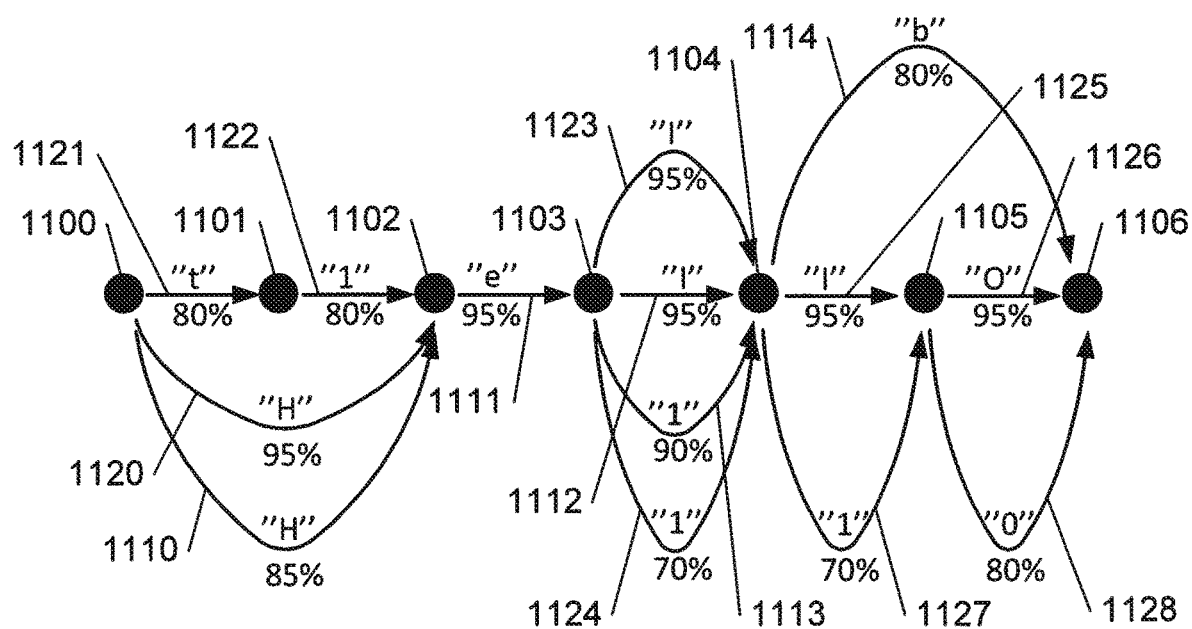

FIG. 11B illustrates the graph that is generated by adding the new nodes 1101, 1105 with new edges by the second OCR engine 120:

1120 representing character "H" with a probability of 95%;

1121 representing character "t" with a probability of 80%;

1122 representing character "1" with a probability of 80%;

1123 representing character "1" with a probability of 95%;

1124 representing character "1" with a probability of 70%;

1125 representing character "1" with a probability of 95%;

1126 representing character "o" with a probability of 95%;

1127 representing character "1" with a probability of 70%; and 1128 representing character "0" with a probability of 80%.

Looking over all possible edges the path determination module 126 outputs that the most likely combination identifies the text image 10 as "Hello".

In a second embodiment of the disclosure, node 1100, representing a first segment is analyzed. Upon analysis of the probability of 85%, this value does not pass the thresholding of step 252 and needs to be processed in the second OCR engine 120. After having been identified, this segment is processed in the second OCR engine 120 and node 1101 is added to the graph with new edges 1121, 1122, 1120.

Next, node 1102 is analyzed and it is determined that it does not need to be processed as it meets all of the predetermined thresholds. The segment identification module 122 continues to node 1103 and determines that it needs to be processed in the second OCR engine 120 since the probability 90% ("l") does not pass the thresholding of step 253. During processing of this segment in the second OCR engine 120 it is determined that this segment was already processed by the first OCR engine 110 with two hypotheses, namely "l" and "1". The second classifier 124 is now limited to only these two possible characters and generates new edges 1123, 1124 representing the same characters with either the same or a different probability. These are also added in the graph by the graph module 121.

Next, node 1104 is analyzed and it is determined that it needs to be processed because the probability of character "b" does not pass the thresholding of step 252. After having been identified, this segment is processed in the second OCR engine 120 and node 1105 is added to the graph with new edges 1125, 1126, 1127, 1128.

In some embodiments of the present disclosure, the OCR method 200 is implemented on a hand-held device, such as a smartphone, a camera, a tablet, etc. to which text images may be uploaded or which may generate text images. In this case, the method 200 may be used, possibly in near real-time and preferably in real-time, to perform an OCR of a text image. In preferred embodiments, the OCR method 200 is implemented in a scanning pen or the like that may be used to scan a text document, possibly line per line. The scanning pen may then perform an OCR on the scanned text images as a first OCR engine and may load or transfer the output machine-readable code to another device, for example, to a computer or the like or to a cloud processor, as a second OCR engine that provides the final OCR document.

In another embodiment, the OCR processing method 200 is implemented on a computer and/or a network system in which text images are uploaded. The computer/network may then perform an OCR on the uploaded documents.

It will be readily appreciated that the first OCR engine 110 may be a faster engine when compared to the second OCR engine 120. As used herein, the term "faster" is intended to indicate that when both OCR engines 110, 120 would be run on the same device to analyze the same text image, the first engine 110 would need less time to provide a result when compared to the second engine 120.

It will also be appreciated that the second OCR engine 120 may be more accurate when compared to the first OCR engine 110. As used herein, the term "more accurate" is intended to indicate that when both OCR engines 110, 120 would be run on the same device to analyze the same text image, the second engine 120 would provide a result that is would contain fewer mistakes when compared to the first engine 110.

It will be readily appreciated that other types of data structures than graphs may be used to order the outputs of the OCR engines without departing from the scope of the disclosure.

Moreover, it will be appreciated that, although the present disclosure has been described with respect to single-character classifiers, other classifiers are also within the scope of the present disclosure. For example, the classifier may classify several characters at a time (e.g. touching characters) or even whole words at a time.

It will be further appreciated that, the first and/or the second classifier may be a multi-stage classifier that uses two or more stages to perform a classification on a segment.

Furthermore, it will be appreciated that, although the graph module 121, the segment identification module 122 and the path determination module 126 have been described as part of the second OCR engine 120, each of these modules may also be split from the second OCR engine 120. For example, the graph module 121 and the segment identification module 122 may also be part of the first OCR engine 110 or may form a separate module that links the first OCR engine 110 to the second OCR engine 120. Similarly, the path determination module 126 may also be a separate module in which case the second OCR engine 120 outputs the final graph to the path determination module 126 which then generates the second OCR output 30.

Although aspects of the present disclosure have been described with respect to specific embodiments, it will be readily appreciated that these aspects may be implemented in other forms.

The invention claimed is:

1. A computer implemented method for optical character recognition, OCR, of a character string in a text image, the method comprising the steps of:
   a) segmenting, by a first OCR engine, the character string into one or more segments;
   b) determining, by the first OCR engine, one or more hypotheses on at least one segment of the character string, each hypothesis being associated with a probability;
   c) subsequently to determining one or more hypotheses on each segment of the character string, identifying a segment of the character string for further processing; and
   d) applying, by a second OCR engine, a second OCR to the identified segment, wherein step d) comprises the steps of:
      segmenting, by a segmentation module in the second OCR engine, a segment of the one or more identified segments into one or more second segments;
      if a second segment has been processed by the first OCR engine, retrieving, from the first OCR engine, a plurality of hypotheses for said second segment;
      if said second segment has not been processed by the first OCR engine, determining, by a classifier in the first OCR engine, a plurality of hypotheses for said second segment; and
      determining, by a classifier of the second OCR engine, a probability associated with one or more of said plurality of hypotheses.

2. A method according to claim 1, wherein the method further comprises the steps of:
   subsequently to applying the second OCR to the identified segment, identifying a further segment of the character string for further processing, said further segment being in the part of the character string following the identified segment; and
   applying, by the second OCR engine, a second OCR to the further segment.

3. A method according to claim 1, wherein step d) is performed subsequently to having identified each segment of the character string for further processing.

4. A method according to claim 1, wherein step c) comprises the steps of:
   determining, for said identified segment, a highest probability associated with said identified segment; and
   identifying said segment as a segment to be processed further if said highest probability is below a predetermined highest likelihood threshold.

5. A method according to claim 4, wherein step c) comprises the steps of:
   determining, for said identified segment, a second highest probability associated with said identified segment; and
   identifying said segment to be processed further if said highest probability is above a second highest threshold.

6. A method according to claim 5, wherein step c) comprises the steps of:
   determining, for said identified segment, said highest probability and said second highest probability associated with said segment;
   determining, for said identified segment, a difference between said highest probability and said second highest probability; and
   identifying said segment to be processed further if said difference is below a predetermined likelihood difference threshold.

7. A method according to claim 1, wherein step c) comprises the steps of:
   determining, for said identified segment, a highest probability associated with a first neighboring segment and a highest probability associated with a second neighboring segment; and
   identifying said segment to be processed further if said highest neighboring probability of said first neighboring segment or said second neighboring segment is below a predetermined highest neighbor likelihood threshold.

8. A method according to claim 1, wherein step c) comprises the steps of:
   determining, for said identified segment, a bounding box of said segment and a neighboring bounding box of a neighboring segment;
   determining, for said identified segment, a distance between the bounding box and the neighboring bounding box; and
   identifying said segment to be processed further if said distance is below a predetermined bounding box threshold.

9. A method according to claim 1, wherein step comprises the steps of:
   determining, for said identified segment, a starting point and a width of said segment;
   determining, for said identified segment, by a segmentation module in the second OCR engine, an expected width of a segment at said starting point;
   determining, for said identified segment, a ratio of said width and said expected width; and
   identifying said segment to be processed further if said ratio is outside of a predetermined range.

10. A method according to claim 1, wherein step c) is performed by the second OCR engine.

11. A computer implemented method for optical character recognition, OCR, of a character string in a text image, the method comprising the steps of:
   segmenting, by a first OCR engine, the character string into one or more segments;
   determining, by a first classifier of the first OCR engine, a plurality of hypotheses for a segment of the character string; and
   determining, by a second classifier of a second OCR engine, a probability associated with one or more of said plurality of hypotheses.

12. A non-transitory computer readable medium storing a program, which when loaded on a computerized system, causes the computerized system to execute a method according to claim 1.

13. A system for optical character recognition, OCR, of a character string in a text image, the system comprising:
   a first OCR engine comprising:
      a first segmentation module configured for segmenting the character string into one or more segments; and
      a first classifier configured for determining one or more hypotheses on at least one segment of the character string, each hypothesis being associated with a probability;
   a second OCR engine comprising:
      a segment identification module configured for, subsequently, to determining one or more hypotheses on each segment of the character string, identifying a segment of the character string for further processing; and a second segmentation module and a second classifier configured for applying a second OCR to the identified segment; wherein, said second segmentation module being further configured to segment, a segment of the one or more identified segments into one or more second segments; and said second segmentation module being further configured to retrieve, from the first OCR engine, a plurality of hypotheses for said second segment, if a second segment has been processed by the first OCR engine; and said first classifier being further configured to determine a plurality of hypotheses for said second segment, if said second segment has not been processed by the first OCR engine; and said second classifier further configured to determine a probability associated with one or more of said plurality of hypotheses.

14. A system according to claim 13, wherein the first OCR engine is faster than the second OCR engine.

15. A system according to claim 13, wherein the second OCR engine is more accurate than the first OCR engine.

* * * * *